(12) United States Patent
Lorca Hernando et al.

(10) Patent No.: US 11,671,150 B2
(45) Date of Patent: Jun. 6, 2023

(54) METHOD AND SYSTEM FOR OPTIMAL SPATIAL MULTIPLEXING IN MULTI-ANTENNA WIRELESS COMMUNICATIONS SYSTEMS USING MU-MIMO TECHNIQUES

(71) Applicant: TELEFONICA, S.A., Madrid (ES)

(72) Inventors: Javier Lorca Hernando, Madrid (ES); Elena Serna Santiago, Madrid (ES); Juan Francisco Esteban Rivas, Madrid (ES)

(73) Assignee: TELEFONICA, S.A., Madrid (ES)

( * ) Notice: Subject to any disclaimer, the term of this patent is extended or adjusted under 35 U.S.C. 154(b) by 0 days.

(21) Appl. No.: 17/760,628

(22) PCT Filed: Sep. 8, 2020

(86) PCT No.: PCT/EP2020/075084
§ 371 (c)(1),
(2) Date: Mar. 15, 2022

(87) PCT Pub. No.: WO2021/052819
PCT Pub. Date: Mar. 25, 2021

(65) Prior Publication Data
US 2022/0337293 A1    Oct. 20, 2022

(30) Foreign Application Priority Data
Sep. 16, 2019   (EP) .................... 19382800.1

(51) Int. Cl.
*H04L 1/02*   (2006.01)
*H04B 7/0452*   (2017.01)
*H04B 7/06*   (2006.01)
*H04L 25/03*   (2006.01)

(52) U.S. Cl.
CPC ......... *H04B 7/0452* (2013.01); *H04B 7/0686* (2013.01); *H04L 25/03898* (2013.01)

(58) Field of Classification Search
CPC .. H04B 7/0689; H04B 7/0452; H04B 7/0639; H04B 7/0691; H04B 7/0874; H04B 7/0617; H04B 7/0697; H04B 7/082; H04L 1/0026; H04L 5/0007; H04W 72/23; H04W 72/542; H04W 72/21
USPC ......................................... 375/267, 260, 262
See application file for complete search history.

(56) References Cited

U.S. PATENT DOCUMENTS

2006/0018288 A1    1/2006   Luo et al.
2007/0281746 A1    12/2007  Takano et al.
2010/0054358 A1*   3/2010   Ko ....................... H04B 7/0452
                                                                 375/267

(Continued)

OTHER PUBLICATIONS

International Search Report for corresponding international application PCT/EP2020/075084, 2 pages, dated Sep. 14, 2020.

*Primary Examiner* — Khai Tran
(74) *Attorney, Agent, or Firm* — Ohlandt, Greeley, Ruggiero and Perle, LLP (57) ABSTRACT

A method and system for optimizing the performance of spatial multiplexing techniques in MU-MIMO wireless systems comprising subsectors where the presence of significant correlation between antenna elements can impair the performance of MU-MIMO techniques. The proposed solution ensures optimum selection of a specific combination of transmit antenna elements and receive antenna elements that maximizes MU-MIMO performance.

15 Claims, 4 Drawing Sheets

(56) References Cited

U.S. PATENT DOCUMENTS

2014/0226735 A1\* 8/2014 Zhang .................. H04B 7/0632
375/260
2017/0099658 A1\* 4/2017 Shattil .................. H04W 12/04

\* cited by examiner

METHOD AND SYSTEM FOR OPTIMAL SPATIAL MULTIPLEXING IN MULTI-ANTENNA WIRELESS COMMUNICATIONS SYSTEMS USING MU-MIMO TECHNIQUES

FIELD OF THE INVENTION

The present invention has its application within the telecommunication sector, particularly in wireless communications. More specifically, the present invention proposes a method and system to optimize spatial multiplexing techniques in multi-antenna wireless communications systems (networks), said multi-antenna wireless systems using Multi-User Multiple Input Multiple Output (MU-MIMO) techniques.

BACKGROUND OF THE INVENTION

Multiple Input Multiple Output (MIMO) techniques are one of the most efficient schemes for increasing the spectral efficiency per user, and per unit area, in wireless networks (for example, in any type of mobile telecommunications networks). MIMO techniques are characterized by the use of multiple antennas for transmission and/or reception at the wireless access point side and usually also at the user (device) side. Multi-User MIMO (MU-MIMO) techniques aim to multiplex several users (user devices) in the spatial domain by simultaneously creating beams that are tailored to the channel state conditions experienced by the users, while also keeping inter-user interference to a minimum; in contrast, Single-User MIMO (SU-MIMO) techniques only deal with a single user device, boosting the single user device throughput by means of spatial multiplexing.

MU-MIMO techniques (and also SU-MIMO techniques) are limited by the channel matrix characteristics, which in turn depend on the surrounding environment and the degree of correlation between the transmit (at the transmission side) and/or receive (at the reception side) antenna elements (also called radiating elements or, simpler, antennas). A high correlation can occur because of similarities in the antenna responses at the transmit side, the receive side, or both, and can also appear because of insufficient scattering phenomena that hinders excitation of the desired number of spatial layers. The consequence is the inability of the radiating system to exploit the degrees of freedom theoretically present in the wireless channel, thus leading to performance degradation. This is especially harmful when multiplexing users in MU-MIMO, because inter-user interference resulting from the presence of high correlation can be very strong.

In order to partially overcome these problems, massive MIMO systems employ a massive number of antennas side (one or two orders of magnitude higher than what would be needed in traditional MIMO systems) at the base station (generally speaking, at the wireless access point). The excess number of antennas leads to some decorrelation of the spatial paths hence improving performance in MU-MIMO. Massive MIMO is characterized by using massive amounts of transmit and receive antennas at the base station side to improve the performance of multi-antenna techniques, namely beamforming (which makes use of multiple independent transceiver chains with full amplitude/phase controls of the signals of each antenna), and spatial multiplexing.

Both linear and non-linear precoding mechanisms exist that minimize the impact of channel matrix correlation, being Dirty Paper Coding (DPC) and Tomlinson-Harashima Precoding (THP) among the most popular ones for the non-linear case. However, both DPC and THP are complex precoding techniques for MU-MIMO that require strong computational resources and very good knowledge of the channel state characteristics. Their use in practical wireless networks is therefore very limited.

Linear precoding techniques are on the contrary simpler to implement, and therefore more popular in Massive MIMO systems that benefit from the presence of large antenna arrays at the base station. The excess antennas enhance the possibilities of linear precoding techniques while still achieving good decorrelation between spatial layers. However, a high degree of spatial resolution can only be achieved with very large arrays, according to the Nyquist criterion (above 64-128 antenna elements in practical systems). Large arrays give rise to significant front-end complexity which usually limits the use of Massive MIMO to hotspots with heavy traffic and large concentration of simultaneous users.

In addition to the above, performance of MU-MIMO techniques can be significantly impaired in line of sight (LOS) conditions. Transmit and receive antennas cannot in general be separated much more than half a wavelength if grating lobes are to be avoided. In LOS conditions, and with such inter-antenna spacing, the ability of the antennas to excite spatial layers can be impaired. This happens e.g. in Fixed Wireless Access (FWA) systems operating in millimetre-waves (above 6 GHz), which behave as wireless Point-to-Multipoint systems with good line of sight between the base station and the users. In these systems, the ability of prior art techniques to exploit MU-MIMO is reduced unless smart techniques are devised to select transmit antennas with the lowest possible RF coupling.

In order to help overcoming the MU-MIMO problems, base stations can benefit from the presence of several subsectors within a given sector, where subsectors are the result of any partition of a sector of a base station into multiple parts. That is, the coverage area of a base station is spatially divided in sectors, and each of said sectors are divided in subsectors. Subsectors can improve the received signal level by spatially isolating users with the aid of subsector beams, hence achieving additional beamforming gains. That is, wireless systems with the ability to define subsectors can improve the received signal quality. Subsectors in many cases do not provide simultaneous digital control of all the transmit antennas, but just a subset of them, as given by the maximum baseband processing power. As an example, the baseband unit may control a maximum of e.g. 8 simultaneous transmit chains, whereas the frontend can comprise three sectors with e.g. 4 antennas per sector, leading to 12 antennas. Finding the optimum association between transmit chains and transmit antennas is therefore key to maximize MU-MIMO performance in this kind of systems.

Smarter strategies are therefore required in order to exploit the benefits of spatial multiplexing techniques in wireless multi-antenna systems using MU-MIMO techniques, with subsectors.

SUMMARY

The present invention solves the aforementioned problems and overcomes previously explained state-of-the-art limitations by proposing a method and a system for optimizing the performance of spatial multiplexing techniques in MIMO wireless (communications) systems comprising subsectors, where the presence of significant correlation between antenna elements can impair the performance of MU-MIMO techniques. In other words, the proposed embodiments present specific mechanisms to optimize MU-MIMO performance, efficiently exploiting the extra number of transmit and receive antennas.

Prior state-of-the-art techniques generally perform a static association of transmit RF (radiofrequency) chains and antennas, in such away that spatial multiplexing employs of a pre-defined set of antenna elements at the base station. However, this approach is not the most efficient one when considering the presence of subsectors, because the actual correlation between antenna elements can make transmission more efficient when letting antennas from different subsectors be involved in the transmission towards a set of users in MU-MIMO. The present embodiments proposed can overcome the limitations of prior art techniques by introducing an efficient method to select the optimum combination of transmit antennas as well as the optimum combination of receive antennas in MU-MIMO, that maximize performance. MU-MIMO performance optimization is achieved by means of exhaustive search of the combination of antennas and user devices that yields the lowest possible channel condition number, being simple to implement and represents a good predictor of performance without resorting to detailed capacity calculations.

The MU-MIMO wireless systems where the proposed embodiments are applied can be any type of wireless communication system. In an embodiment, the wireless system is a cellular communications system for example a 2G, 3G, 4G or 5G mobile communications system or any other type of cellular communications systems. The user devices (equipment) may be mobile telephones, tablets, smartphones, laptops, computers, PCs . . . (and generally any electronic equipment or device that can be connected to the wireless communication system).

According to a first aspect, the present invention proposes a method to optimize the performance of a MU-MIMO wireless communications system, said wireless communications system comprising at least a base station, with at least one sector having P subsectors with $N_t$ transmit antenna elements each, and M user devices (to be served using MU-MIMO wireless techniques) with $N_r$ receive antenna elements each, being L the maximum number of transmit antenna elements which the base station can simultaneously control at baseband processing level, characterized in that the method comprises the following steps:

a0) Setting the (initial) number of receive antenna elements to be selected, L', to a pre-established initial value (being this pre-established initial value usually equal to 2, but generally speaking it can be any value >=2); and going to step a1)

a1) Selecting a combination $A_i$ of L transmit antenna elements from the $PN_t$ transmit antenna elements and selecting a combination $B_j$ of L' receive antenna elements from the $MN_r$ receive antenna elements; and going to step a2);

a2) Calculating the channel condition number of a channel matrix between the L transmit antenna elements contained in $A_i$ and the L' receive antenna elements contained in $B_j$; and going to step a3);

a3) If the channel condition number calculated in step a2) is lower than a recorded lowest channel condition number or if there is no recorded lowest channel condition number (that is, it is the first iteration of the method), recording the value of the calculated channel condition number as the lowest channel condition number and recording actual combinations of transmit antenna elements and receive antenna elements $A_i$ and $B_j$ respectively, as the optimum combinations of transmit and receive antenna elements; and going to step a4);

a4) If all possible combinations ($A_i$, $B_j$) of transmit antenna elements and receive antennas have been selected (for the current value of L'), going to step b), otherwise going to step a1);

b) Increasing L' by one; if L'>min($MN_r$, L), ending the method, otherwise going to step a1) (with the increased value of L').

In an embodiment, step a2 comprises:

a21) Constructing a channel (sub)matrix $H_{ij}$ for the L transmit antennas contained in $A_i$ and the L' receive antennas contained in $B_j$; $H_{ij}=(h_{mn})|_{L'\times L}$, $m \in B_j$, $n \in A_i$, where $h_{mn}$ denotes elements of the channel matrix H, being H a channel matrix of the channels between the $PN_t$ transmit antenna elements and the $MN_r$ receive antenna elements; and going to step a22);

a22) Calculating the channel condition number of $H_{ij}$ defined by:

$$CN(dB) 20\log \frac{\sigma_{max}}{\sigma_{min}}$$

where $\sigma_{max}$ and $\sigma_{min}$ denote respectively the maximum and minimum singular values of the channel matrix $H_{ij}$.

The optimum combinations of transmit and receive antenna elements obtained may be used by the wireless communications system during a time lower or equal than the coherence time of the channel between the transmit and the receive antenna elements.

In an embodiment, if after finalizing the method, the recorded lowest possible channel condition number exceeds the channel (between the transmit and the receive antenna elements) signal to noise ratio for the obtained optimum combinations of L transmit antennas and L' receive antennas, then the wireless system decides not to use MU-MIMO techniques to serve the users devices.

The method may be periodically carried out every certain period of time (for example, a period of time is equal to the coherence time of the channels between the transmit and the receive antenna elements). The period of time may depend on the communications protocol used by the wireless system.

The optimum combination of L' receive antenna elements obtained may belong to the same user device or to multiple user devices.

In an embodiment, $A_i$ is a combination selected from all possible combinations of $PN_t$ antenna elements taken L by L without repetition, with i=0, . . . , $C_{PN_t}^{L}-1$, being $C_{PN_t}^{L}$ the number of possible combinations given by:

$$C_{PN_t}^{L} = \binom{PN_t}{L} = \frac{(PN_t)!}{L!(PN_t-L)!}$$

and $B_j$ is a combination selected from all possible combinations of $MN_r$ receive antennas taken L' by L' without repetition, with j=0, . . . , $C_{MN_r}^{L'}-1$, being $C_{MN_r}^{L'}$, the number of possible combinations given by:

$$C_{MN_r}^{L'} = \binom{MN_r}{L'} = \frac{(MN_r)!}{L'!(MN_r-L')!}$$

The MU-MIMO wireless communications system may be for example a 2G, 3G, 4G or 5G mobile communications system or any other type of wireless communications system using MU-MIMO techniques.

According to a second aspect, the present invention proposes a system which perform any of the above stated methods. For example, a MU-MIMO wireless communications system comprising:

at least a base station, with at least one sector having P subsectors with $N_t$ transmit antenna elements each, the base station having a baseband processing unit capable of simultaneously control a maximum of L transmit antenna elements;

M user devices with $N_r$ receive antenna elements each; and being H the channel matrix (which usually is a-priori known by the base station) between the $PN_t$ transmit antenna elements and the $MN_r$ receive antenna elements;

an electronic device for optimizing the performance of the MU-MIMO wireless communications system, configured to:

a0) Set the number of receive antenna elements to be selected L' to a pre-established initial value (<=2);

a1) Select a combination $A_i$ of L transmit antenna elements from the $PN_t$ transmit antenna elements and select a combination $B_j$ of L' receive antenna elements from the $MN_r$ receive antenna elements; and go to a2);

a2) Calculate the channel condition number of a channel matrix between the L transmit antenna elements contained in $A_i$ and the L' receive antenna elements contained in $B_j$; and going to a3);

a3) If the calculated channel condition number is lower than a recorded lowest channel condition number or if there is no recorded lowest channel condition number, record the value of the calculated channel condition number as the lowest channel condition number and record actual combinations of transmit antenna elements and receive antenna elements $A_i$ and $B_j$ respectively as the optimum combinations of transmit and receive antenna elements; and go to a4)

a4) If all possible combinations $(A_i, B_j)$ of transmit antenna elements and receive antennas have been selected, go to b), otherwise go to a1);

b) Increase L' by one and if L'>min($MN_r$, L), end the procedure; otherwise go to a1).

In an embodiment, the electronic device is part of the base station, for example, part of the baseband processing unit of the base station.

In an embodiment, the electronic device is located in a radio access node of the MU-MIMO wireless communications system.

In a last aspect of the present invention, a computer program is disclosed, comprising computer program code means adapted to perform the steps of the described methods, when said program is run on processing means of a network entity of an OFDMA network, said processing means being for example a computer, a digital signal processor, a field-programmable gate array (FPGA), an application-specific integrated circuit (ASIC), a micro-processor, a micro-controller, or any other form of programmable hardware. In other words, a computer program comprising instructions, causing a computer executing the program to perform all steps of the described method, when the program is run on a computer. A digital data storage medium is also provided for storing a computer program comprising instructions, causing a computer executing the program to perform all steps of the disclosed methods when the program is run on a computer.

Consequently, according to the invention, a method, system and storage medium according to the independent claims are provided. Favourable embodiments are defined in the dependent claims.

These and other aspects and advantages of the invention will be apparent from and elucidated with reference to the embodiments described hereinafter.

DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

Figure 1:
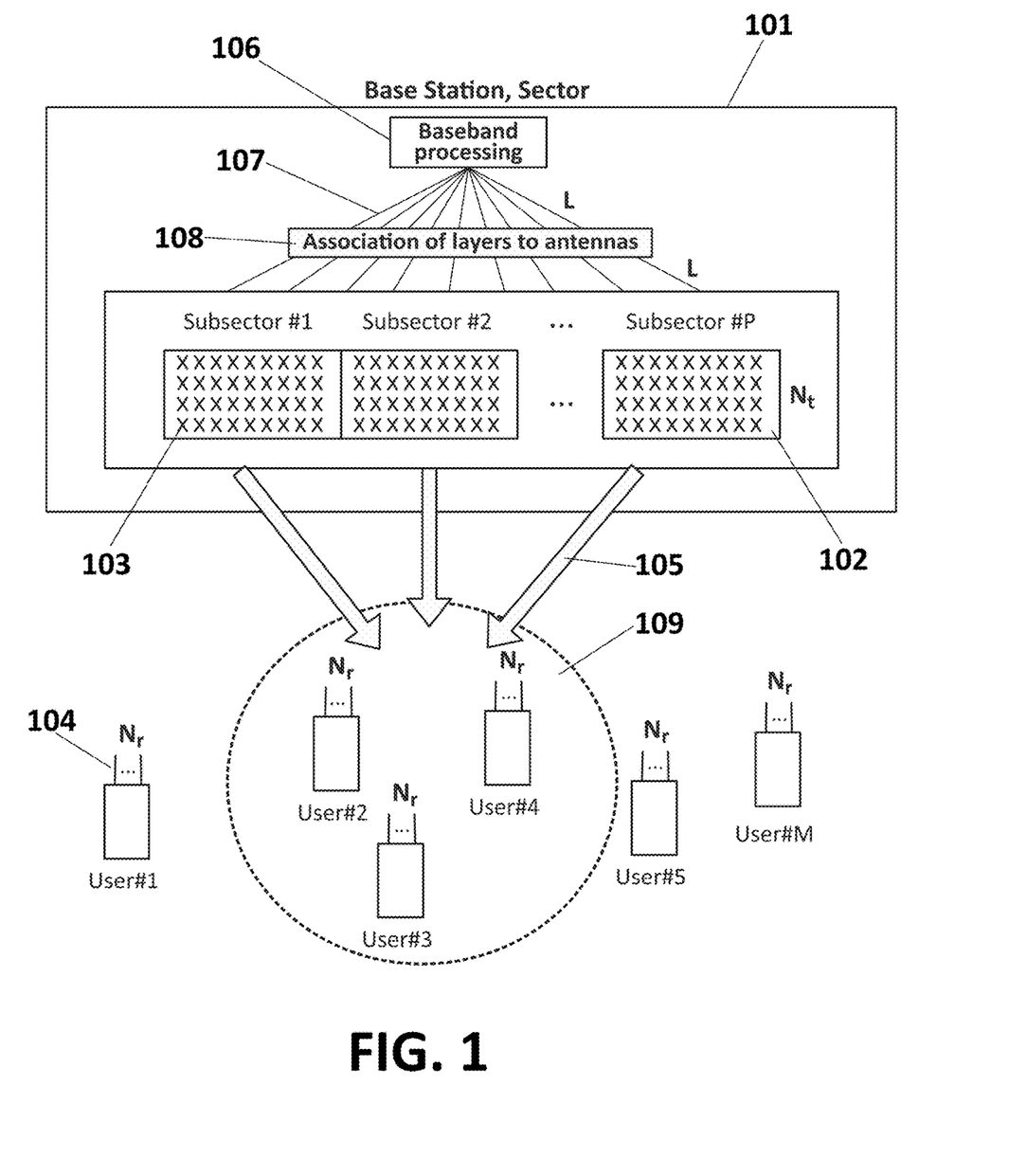
FIG. 1 depicts a schematic diagram showing a wireless system, where the proposed solution is applied according to an embodiment of the invention.

FIG. 1 illustrates (without limitation purposes) a wireless system, where the proposed solution is applied according to an embodiment of the invention. The wireless system (or wireless network) comprising at least a base station, serving M (M>1) users (user devices) by means of MU-MIMO techniques (105) (or in other words, the wireless system is a MU-MIMO wireless system). The base station comprising at least one sector (101), the sector comprising P subsectors (102), each subsector having $N_t$ transmit antenna elements (103), capable of generating an independent set of wireless beams.

Each user device is assumed to be equipped with $N_r$ receive antenna elements (104). The base station benefits from full digital control at baseband processing level (106) of up to L simultaneous antenna elements (107) across the P subsectors (that is, the base station has amplitude and phase control of L antenna elements simultaneously) and has full (perfect) a-priori knowledge of the (RF) channels (for example, of the constant channel matrix H) between the $PN_t$ transmit antenna elements and the users' $MN_r$ antenna elements. In the embodiments of the invention, L is lower than the total number of transmit antennas at the base station side, $PN_t$. Generally speaking, P, $N_t$, $N_r$, M and L are system design features which may have any value depending on the wireless systems where any of the proposed embodiments is applied.

The embodiments of the invention are focused in the MU-MIMO operation of the wireless system with a group of user devices, but it is not mandatory that all the user devices served by the wireless system are served using MU-MIMO techniques (pure MU-MIMO wireless system), that is, in some embodiments the wireless system will be a pure MU-MIMO wireless system but in other embodiments, the wireless system may serve other user devices with SU-MIMO techniques. In other words, the wireless system (even the same base station) can serve some user devices as single users using SU-MIMO techniques and serve other user devices using MU-MIMO techniques.

As it will be explained later, the proposed mechanism for association of layers to antenna elements (108), optimizes the actual combination of L transmit antenna elements among the $PN_t$ antenna elements contained in the sector, and L' receive antennas among the $MN_r$ antenna elements present in the user devices (with L'≤min(L, $MN_r$)), such that MU-MIMO performance is maximized. FIG. 1 also illustrates the optimum group of users (109) corresponding to the L' receive antennas selected by the proposed algorithm to maximize MU-MIMO performance, as provided by (108), where users #2, #3 and #4 (in dotted circle) are selected together with a given set of L transmit antenna elements to optimize MU-MIMO performance.

Figure 2:
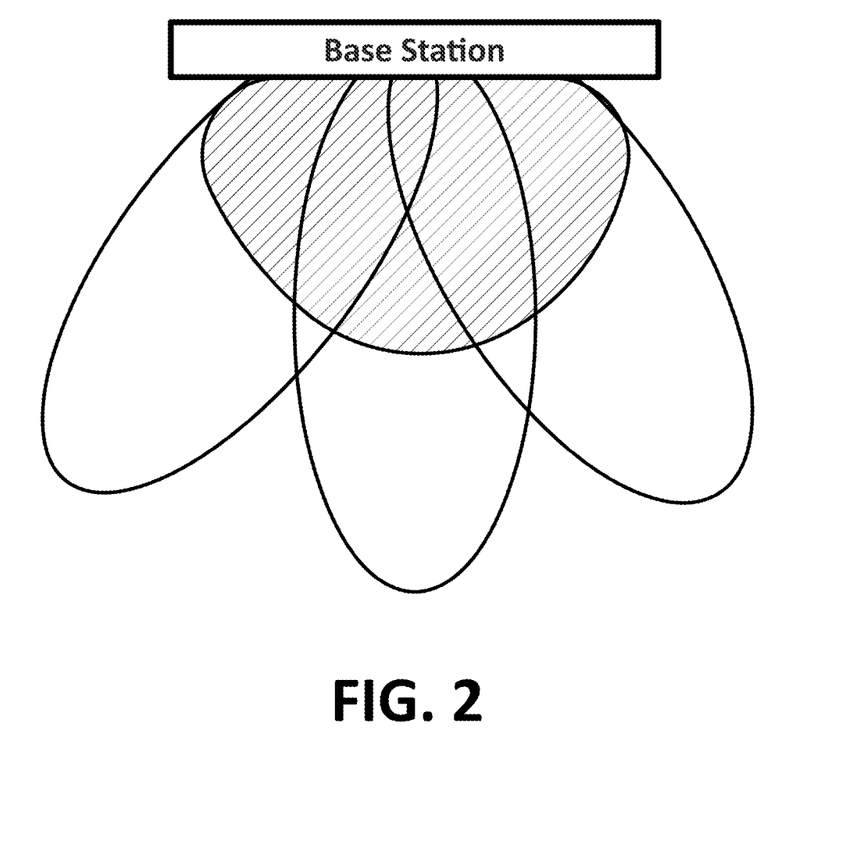
FIG. 2 shows a schematic diagram illustrating gain improvement due to the division of a sector in several subsectors, according to an embodiment of the invention.

The P subsectors introduced in the system provide better resolution capabilities thanks to the natural isolation provided by the spatial characteristics of the subsector antennas. As an example, FIG. 2 illustrates a scenario where different users are served by different subsectors in a given sector. Partitioning the sector into P subsectors provides an additional gain compared to a more traditional scenario without subsectors, because subsector antennas can point more precisely towards the user locations thus improving the link budget. This obviously requires some mechanism at the base station to identify the best subsector for each user and to associate specific transmit/receive antennas to users depending on the channel characteristics.

Even though, for conciseness purposes, the techniques described in the embodiments refer to downlink operation, a person skilled in the art can easily apply the same embodiments described here to uplink operation.

The aim of the proposed embodiments is to optimize the performance of spatial multiplexing techniques in MU-MIMO wireless systems (that is, in wireless systems using MU-MIMO techniques) or, in other words, to achieve optimum association of antenna elements to spatial layers in MU-MIMO so that cell throughput is maximized. In MIMO systems, spatial layers are also called streams, or spatial eigen-modes (eigenmodes) of the channels and represent the modes of propagation through which information can be conveyed; layers must always be associated to antennas for their transmission, in a process sometimes called "layer mapping".

Now, it will be detailly explained how this optimization is achieved.

Figure 3:
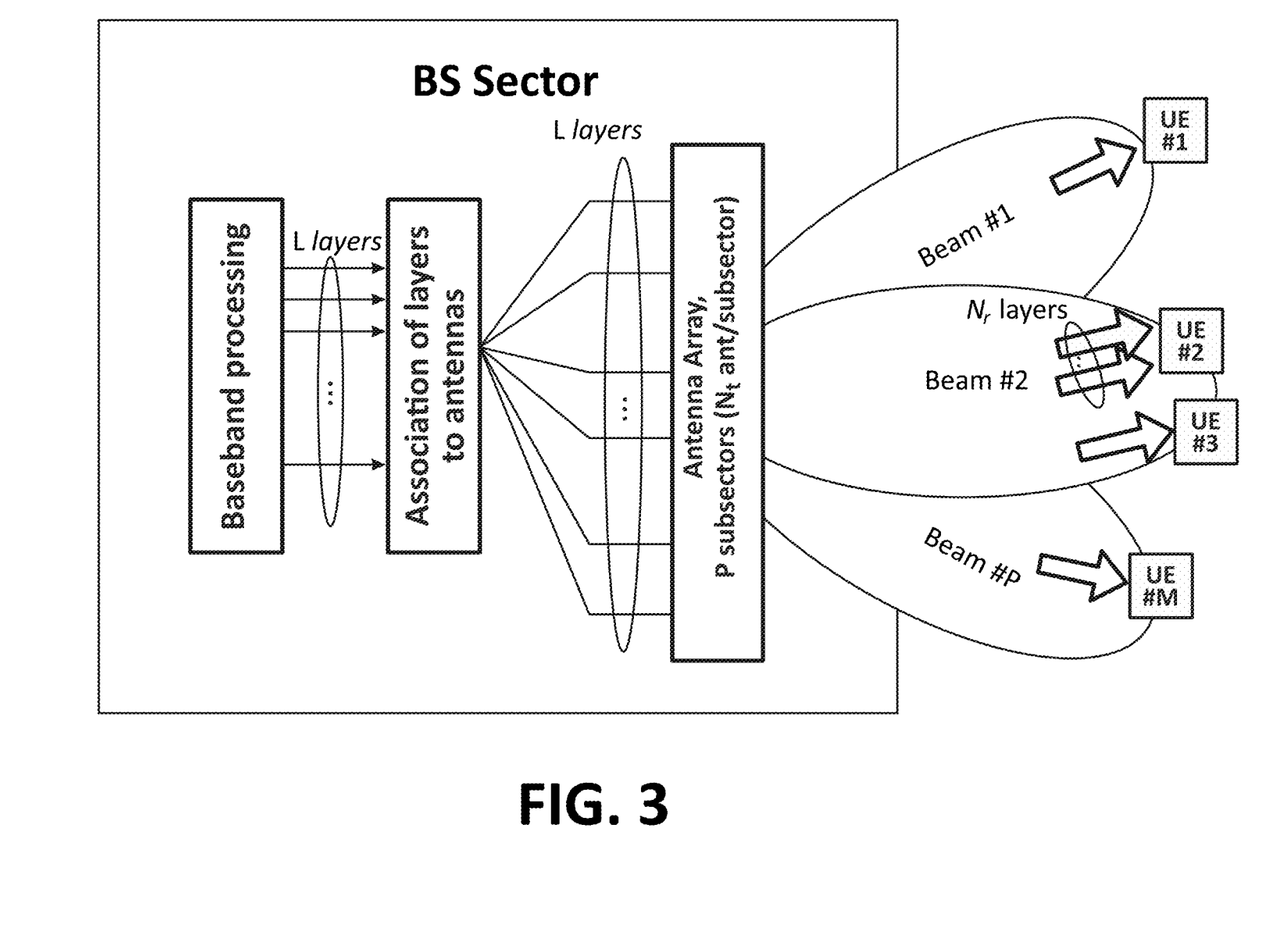
FIG. 3 shows a schematic diagram of a wireless system with users served by means of MU-MIMO technique, where an embodiment of the invention can be applied.

FIG. 3 illustrates a scenario (a wireless system) where the present embodiments can be applied. Here, M users (users devices) #1, #2, #3 . . . #M are served in MU-MIMO by means of a suitable combination of L antenna elements (from the total number of antenna elements, $PN_t$) across the P subsectors (also called beams) #1, #2, #3 . . . #P; being L the maximum number of antenna elements in which (at baseband processing level) the base station can have simultaneous amplitude/phase control in said sector.

In contrast with the SU-MIMO case, there is no closed-form expression for the MU-MIMO capacity region, defined as a region comprising a set of user data rates (the user bit rates or throughput characterizing the connection) with arbitrarily low probability of error.

A popular non-linear precoding technique that approaches MU-MIMO capacity is so-called Dirty Paper Coding (DPC), which involves complex pre-subtraction of known interference at the transmitter side. DPC is usually very difficult to implement. There are also other sub-optimal strategies, like e.g. Tomlinson-Harashima Precoding (THP), or sphere decoding, which are simpler to implement but for which no closed-form expressions exist to date for the achievable capacity.

In order to select the best antenna combination that optimizes capacity, one useful characteristic of MIMO techniques is the dependency of its performance with the channel condition number, which may be defined as:

$$CN(\text{dB}) = 20\log\frac{\sigma_{max}}{\sigma_{min}},$$

where $\sigma_{max}$ and $\sigma_{min}$ denote respectively the maximum and minimum singular values of the channel matrix H and are related with the power of the corresponding eigenmodes.

The channel condition number generally varies with time and frequency. It is related with the channel rank (the number of singular values not equal to zero of the channel matrix H, it is thus an indicator of how many data streams can be spatially multiplexed on the MIMO channel) but provides better insight on the feasibility of the channel to exhibit multiple spatial layers for wireless transmission. While the channel rank represents a hard limit to the number of spatial layers supported by the channel, the condition number is a real number reflecting the ratio between the magnitudes of the eigenmodes with respectively highest and lowest powers. It states how performance will be degraded as a result of the different relative magnitudes of the eigenmodes: if the condition number is high, the highest eigenmodes will dominate over the weakest ones, and performance will be very sensitive to noise-induced errors. The channel matrix is thus said to be ill-conditioned. In contrast, if the condition number is low, the eigenmodes will have similar magnitudes and performance will be more robust against channel noise.

For a given channel rank it can be said that the lower the condition number, the better the ability of the channel to resolve multipaths. A practical rule of thumb states that, if the channel condition number is larger than the signal to noise ratio (SNR), MIMO separation of spatial layers will not work property, and it may be preferable to fall back to SU-MIMO operation.

Figure 4:
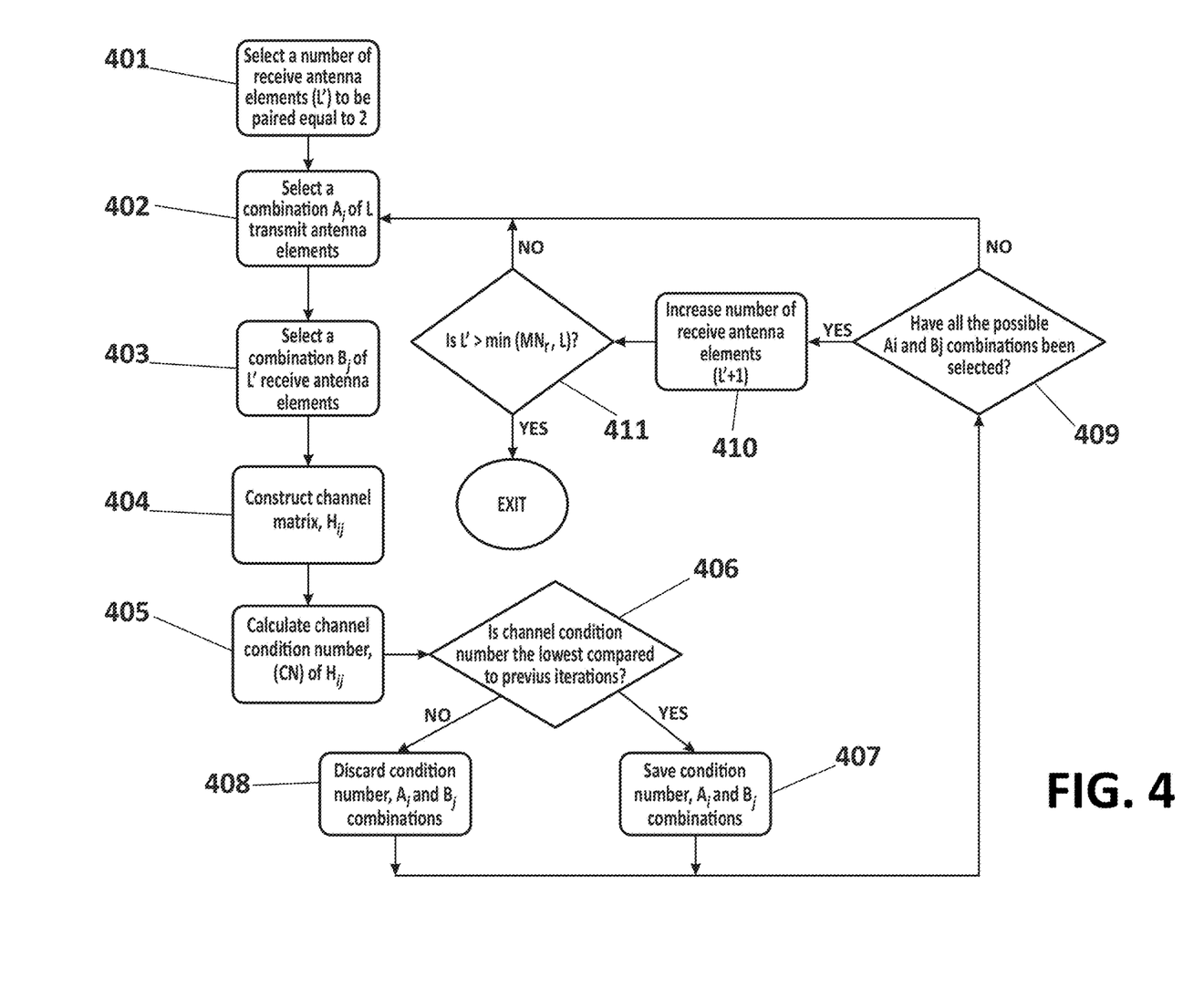
FIG. 4 shows a flowchart for the proposed solution according to an embodiment of the invention.

The following steps, according to an embodiment, ensure optimum selection of L transmit antenna elements and L' receive antenna elements (L'≤min($MN_r$, L)). In other words, thanks to the proposed mechanism as disclosed in the following steps, the L transmit antenna elements and L' receive antenna elements that maximizes MU-MIMO performance in a subsector-based MU-MIMO wireless system are selected. For clarity purposes (and without any limitation purpose), the steps will be explained for a MU-MIMO wireless system as the one shown in FIG. 1 or 3. FIG. 4 illustrates the proposed mechanism in a flow diagram.

1. For a given time instant, let the initial number of receive antenna elements to be paired L' equal to 2 (401); this is only a preferable option and other initial values for L' can be used. Baseband processing techniques are based on discrete time instants, whose interval is defined by the communication standard being used by the wireless system (for example in LTE the instants are always multiples of 1 ms), hence the exact time instant in which this algorithm (method steps) is carried out is a design option that will depend on the communication standard used (that is why the algorithm is explained here for "a given time instant" without loss of generality). Likewise, the algorithm can be generally repeated with a periodicity time that also depends on the standards specification (in LTE may be 1 ms and in other communication standards like for example 5G, it can be different).

1.1. Select (402) a combination (group) $A_i$ of L transmit antenna elements, among all possible groups of $PN_t$ antenna elements indices (spanning from 0 to $PN_t-1$, as the total number of transmit antenna elements is $PN_t$) taken L by L without repetition. For $PN_t$ antenna elements, the number of possible combinations (groups) taken L by L without repetition is given by:

$$C_{PN_t}^L = \binom{PN_t}{L} = \frac{(PN_t)!}{L!(PN_t - L)!}$$

So $A_i$ will be one of said combinations with i being in the range $0, \ldots, C_{PN_t}^L - 1$.
Go to step 1.2.

1.2. Select (403) a combination $B_j$ of L' receive antenna elements, among all possible combinations of $MN_r$ receive antennas taken L' by L' without repetition. For $MN_r$ antenna elements, the number of possible combinations taken L' by L' without repetition is given by: $(C_{MN_r}^{L'})$, with $j=0, \ldots, C_{MN_r}^{L'}-1$.

$$C_{MN_r}^{L'} = \binom{MN_r}{L'} = \frac{(MN_r)!}{L'!(MN_r - L')!}$$

So $B_j$ will be on of said combinations with j being in the range $0, \ldots, C_{MN_r}^{L'}-1$.
Go to step 1.3.

1.3. Calculate the channel condition number of the channel (sub)matrix for the L transmit antenna elements and L' receive antenna elements selected. In an embodiment this is done by (this is only an example and there are other ways of calculating the channel condition number):

1.3.1. Construct (404) a channel (sub)matrix $H_{ij}$ by selecting the L transmit antennas contained in $A_i$ and the L' receive antennas contained in $B_j$, with dimensions L'×L. That is: $H_{ij}=(h_{mn})|_{L'\times L}$, $m \in B_j$, $n \in A_i$, where $h_{mn}$ denotes elements of the channel matrix H. Go to step 1.3.2.

1.3.2. Calculate (405) the channel condition number of $H_{ij}$ defined by:

$$CN(dB) = 20\log\frac{\sigma_{max}}{\sigma_{min}}$$

where $\sigma_{max}$ and $\sigma_{min}$ denote respectively the maximum and minimum singular values of the channel matrix $H_{ij}$; and go to step 1.4.

1.4. (406) If the calculated channel condition number is the lowest channel condition number compared to all previous iterations (407), (that is, if it is the first channel condition number calculated or the channel condition number is the lowest of all previously encountered for any value of L'), record its value as the lowest channel condition number and record actual combinations of transmit antenna elements and receive antenna elements $A_i$ and $B_j$ respectively as the optimum combination of antenna elements; and go to step 1.5. Otherwise (408) go to step 1.5 (without recording the value or the combinations of antenna elements).

1.5. Repeat steps 1.1 to 1.4 for a different combination $(A_i, B_j)$ of transmit antenna elements $(A_i)$ and receive antennas $(B_j)$. until all possible combinations $A_i$, $B_j$ of transmit antenna elements and receive antennas (for the current value of L') are considered. Or in other words, check if all possible combinations of transmit antenna elements $(A_i)$ and receive antennas $(B_j)$ have been considered (409); if so, go to step 2 (410) and if not, repeat steps 1.1 to 1.4, preferably for a different combination $(A_i, B_j)$ of transmit antenna elements and receive antenna elements (that is, a combination $(A_i, B_j)$ of transmit antenna elements and receive antenna elements not considered in any previous iteration).

2. When all possible combinations of transmit antenna elements and receive antennas have been considered for the current value of L', increase L' by one (410).

3. Repeat steps 1 and 2 until L'>min($MN_r$, L) (411).

The last combinations of transmit antenna elements and receive antenna elements ($A_i$ and $B_j$ respectively), stored in step 1.5 as the optimum combination of antenna elements will be the outcome of the algorithm. That is, this outcome will be the combination of L transmit antennas and L' receive antennas (the wireless system will multiplex transmissions towards the L' receive antennas by means of the selected L transmit antennas) that yields the lowest possible channel condition number, and therefore the best expected MU-MIMO performance.

In an embodiment, said obtained optimum combination of transmit and receive antennas for application of MU-MIMO techniques is kept over a duration lower or equal than the coherence time of the channels (between the $PN_t$ transmit antenna elements and the users' $MN_r$ antenna elements). And optionally, these steps are repeated after the coherence time of the channel has passed. Likewise, this algorithm can be generally repeated with a periodicity time equal to the coherence time of the channel.

The L' receive antenna elements obtained applying the proposed solution (that is, the L' receive antenna elements that yields to the best expected MU-MIMO performance) can comprise any combination of antennas, whether belonging to a given user or multiple users, that minimizes the channel condition number. FIG. 1 illustrates the optimum group of users (109) corresponding to the L' receive antennas selected by the proposed algorithm to maximize MU-MIMO performance where users #2, #3 and #4 (in dotted circle) are selected together with a given set of L transmit antenna elements to optimize MU-MIMO performance.

In an embodiment, if the lowest possible condition number obtained with the above algorithm is not enough (for example, it still exceeds the SNR of the channel), then the system may decide not to activate MU-MIMO and keep only SU-MIMO operation, depending on the actual Implementation.

The proposed mechanism (the above explained steps) can be performed in any electronic device with enough processing capabilities. It may be performed for example by the base station itself (for example, by the baseband processing unit of the base station) or by any other node internal or external to the wireless system (wireless network).

The proposed embodiments can be implemented by means of software elements, hardware elements, firmware elements, or any suitable combination of them.

Note that in this text, the term "comprises" and its derivations (such as "comprising", etc.) should not be understood in an excluding sense, that is, these terms should not be interpreted as excluding the possibility that what is described and defined may include further elements, steps, etc.

The matters defined in this detailed description are provided to assist in a comprehensive understanding of the invention. Accordingly, those of ordinary skill in the art will recognize that variation changes and modifications of the embodiments described herein can be made without departing from the scope of the invention. Also, description of well-known functions and elements are omitted for clarity and conciseness. Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

What is claimed is:

1. A method to optimize the performance of a MU-MIMO wireless communications system, said wireless communications system comprising at least a base station, with at least one sector having P subsectors with $N_t$ transmit antenna elements each, and M user devices with $N_r$ receive antenna elements each, being L the maximum number of transmit antenna elements which the base station can simultaneously control at baseband processing level, wherein the method comprises the following steps:
    a0) setting the number of receive antenna elements to be selected, L', to a pre-established initial value higher or equal to 2; and going to step a1)
    a1) selecting a combination $A_i$ of L transmit antenna elements from the $PN_t$ transmit antenna elements and selecting a combination $B_j$ of L' receive antenna elements from the $MN_r$ receive antenna elements; and going to step a2);
    a2) calculating the channel condition number of a channel matrix between the L transmit antenna elements contained in $A_i$ and the L' receive antenna elements contained in $B_j$; and going to step a3);
    a3) if the channel condition number calculated in step a2) is lower than a recorded lowest channel condition number or if there is no recorded lowest channel condition number, recording the value of the calculated channel condition number as the lowest channel condition number and recording actual combinations of transmit antenna elements and receive antenna elements, $A_i$ and $B_j$ respectively, as the optimum combinations of transmit and receive antenna elements; and going to step a4);
    a4) if all possible combinations of transmit antenna elements and receive antenna elements ($A_i$, $B_j$) have been selected, going to step b), otherwise going to step a1);
    b) increasing L' by one; if L'>min($MN_r$, L), ending the method, otherwise going to step a1).

2. The method according to claim 1 wherein step a2) comprises:
    a21) constructing a channel matrix $H_{ij}$ for the L transmit antennas contained in $A_i$ and the L' receive antennas contained in $B_j$; $H_{ij}=(h_{mn})|_{L'\times L}$, $m \in B_j$, $n \in A_i$, where $h_{mn}$ denotes elements of the channel matrix H, being H a channel matrix of the channels between the $PN_t$ transmit antenna elements and the $MN_r$ receive antenna elements;
    and going to step a22);
    a22) calculating the channel condition number of $H_{ij}$ defined by:

$$CN(dB) = 20 \log \frac{\sigma_{max}}{\sigma_{min}}$$

where $\sigma_{max}$ and $\sigma_{min}$ denote respectively the maximum and minimum singular values of the channel matrix $H_{ij}$.

3. The method according to claim 1, wherein the optimum combinations of the transmit and the receive antenna elements obtained are used by the wireless communications system during a time lower or equal than the coherence time of the channels between the transmit and the receive antenna elements.

4. The method according to claim 1, wherein if after finalizing the method, the recorded lowest possible channel condition number exceeds the channels' signal to noise ratio for the obtained optimum combinations of L transmit antennas and L' receive antennas, then the wireless system decides not to use MU-MIMO techniques to serve the users devices.

5. The method according to claim 1, wherein the method is periodically carried out every certain period of time.

6. The method according to claim 5, wherein the period of time is equal to the coherence time of the channels between the transmit and the receive antenna elements.

7. The method according to claim 1, wherein the optimum combination of L' receive antenna elements obtained belongs to the same user device or to multiple user devices.

8. The method according to claim 1, wherein $A_i$ is a combination selected from all possible combinations of $PN_t$ antenna elements taken L by L without repetition, with i being one of 0, ..., $C_{PN_t}^L - 1$, being $C_{PN_t}^L$ the number of possible combinations given by:

$$C_{PN_t}^L = \binom{PN_t}{L} = \frac{(PN_t)!}{L!(PN_t - L)!}$$

and where $E_j$ is a combination selected from all possible combinations of $MN_r$ receive antennas taken L' by L' without repetition, with j being one of 0, ..., $C_{MN_r}^{L'} - 1$, being $C_{MN_r}^{L'}$, the number of possible combinations given by:

$$C_{MN_r}^{L'} = \binom{MN_r}{L'} = \frac{(MN_r)!}{L'!(MN_r - L')!}.$$

9. The method according to claim 1, wherein the MU-MIMO wireless communications system is a 2G, 3G, 4G or 5G mobile communications system.

10. The method according to claim 1, wherein in step a0), L' is set to the pre-established initial value equal to 2.

11. A non-transitory computer readable medium encoded with a computer program comprising instructions for carrying out all the steps of the method according to claim 1, when said computer program is executed on a computer system.

12. A MU-MIMO wireless communications system comprising:
    at least a base station, with at least one sector having P subsectors with $N_t$ transmit antenna elements each, the base station having a baseband processing unit capable of simultaneously control a maximum of L transmit antenna elements;

M user devices with $N_r$ receive antenna elements each;
an electronic device to optimize the performance of the MU-MIMO wireless communications system, configured to:

a0) set the number of receive antenna elements to be selected L' to a pre-established initial value higher or equal to 2;

a1) select a combination $A_i$ of L transmit antenna elements from the $PN_t$ transmit antenna elements and select a combination $B_j$ of L' receive antenna elements from the $MN_r$ receive antenna elements; and go to a2);

a2) calculate the channel condition number of a channel matrix between the L transmit antenna elements contained in $A_i$ and the L' receive antenna elements contained in $B_j$; and going to a3);

a3) If the calculated channel condition number is lower than a recorded lowest channel condition number or if there is no recorded lowest channel condition number, record the value of the calculated channel condition number as the lowest channel condition number and record actual combinations of transmit antenna elements and receive antenna elements $A_i$ and $B_j$ respectively as the optimum combinations of transmit and receive antenna elements; and go to a4)

a4) If all possible combinations of transmit antenna elements and receive antenna elements ($A_i$, $B_j$) have been selected, go to b), otherwise go to a1);

b) increase L' by one and if L'<=min($MN_r$, L) go to a1).

13. The system according to claim 12, wherein the electronic device is part of the base station.

14. The system according to claim 13, wherein the electronic device is part of the baseband processing unit of the base station.

15. The system according to claim 12, wherein the electronic device is located in a radio access node of the MU-MIMO wireless communications system.

\* \* \* \* \*